United States Patent
Karadeniz et al.

(10) Patent No.: US 10,830,894 B2
(45) Date of Patent: Nov. 10, 2020

(54) INTENSITY AND DEPTH MEASUREMENTS IN TIME-OF-FLIGHT SENSORS

(71) Applicant: Zoox, Inc., Foster City, CA (US)

(72) Inventors: Turhan Karadeniz, Oakland, CA (US); Ryan McMichael, Mountain View, CA (US); Robert Nicholas Moor, San Mateo, CA (US); Denis Nikitin, Campbell, CA (US); Subasingha Shaminda Subasingha, Weston, FL (US)

(73) Assignee: Zoox, Inc., Foster City, CA (US)

( * ) Notice: Subject to any disclaimer, the term of this patent is extended or adjusted under 35 U.S.C. 154(b) by 240 days.

(21) Appl. No.: 16/198,208

(22) Filed: Nov. 21, 2018

(65) Prior Publication Data

US 2020/0158876 A1 May 21, 2020

(51) Int. Cl.
*G01S 17/931* (2020.01)
*G01S 7/48* (2006.01)
*G01S 7/484* (2006.01)
*G05D 1/02* (2020.01)
(Continued)

(52) U.S. Cl.
CPC .......... *G01S 17/931* (2020.01); *G01S 7/4802* (2013.01); *G01S 7/484* (2013.01); *G05D 1/0088* (2013.01); *G05D 1/0231* (2013.01); *G05D 2201/0213* (2013.01); *H04L 67/12* (2013.01)

(58) Field of Classification Search
None
See application file for complete search history.

(56) References Cited

U.S. PATENT DOCUMENTS

| 5,504,488 A | 4/1996 | Henderson et al. |
| 7,218,271 B2 | 5/2007 | Aker et al. |
| 2008/0278365 A1 | 11/2008 | Klein et al. |

(Continued)

FOREIGN PATENT DOCUMENTS

| CN | 102567986 A | 7/2012 |
| DE | 102011052815 A1 | 2/2012 |

(Continued)

OTHER PUBLICATIONS

The PCT Search Report and Written Opinion dated Oct. 17, 2019 for PCT Application No. PCT/US2019/039005, 10 pages.

(Continued)

*Primary Examiner* — Jonathan M Dager
*Assistant Examiner* — Garrett F Evans
(74) *Attorney, Agent, or Firm* — Lee & Hayes, P.C.

(57) ABSTRACT

Sensors, including time-of-flight sensors, may be used to detect objects in an environment. In an example, a vehicle may include a time-of-flight sensor that images objects around the vehicle, e.g., so the vehicle can navigate relative to the objects. The sensor may generate first image data at a first configuration and second image data at a second configuration. The first image data and the second image data may be combined to provide disambiguated depth and improved intensity values for imaging the environment. In some examples, the first and second configurations may have different modulation frequencies, different integration times, and/or different illumination intensities. In some examples, configurations may be dynamically altered based on depth and/or intensity information of a previous frame.

20 Claims, 5 Drawing Sheets

(51) Int. Cl.
*G05D 1/00* (2006.01)
*H04L 29/08* (2006.01)

(56) References Cited

U.S. PATENT DOCUMENTS

| | | | |
|---|---|---|---|
| 2012/0050714 A1* | 3/2012 | McConville | F42C 11/002 356/4.01 |
| 2014/0022110 A1 | 1/2014 | Itohara et al. | |
| 2016/0124089 A1* | 5/2016 | Meinherz | G01S 17/894 356/5.01 |
| 2018/0143298 A1* | 5/2018 | Newman | G06Q 30/0269 |
| 2018/0329063 A1* | 11/2018 | Takemoto | G01S 17/86 |
| 2019/0391250 A1 | 12/2019 | Cohen et al. | |

FOREIGN PATENT DOCUMENTS

| | | |
|---|---|---|
| EP | 3012657 | 4/2016 |
| WO | WO199737242 | 10/1997 |

OTHER PUBLICATIONS

Non Final Office Action dated May 28, 2020 for U.S. Appl. No. 16/019,067 "Radar Clustering and Velocity Disambiguation" Cohen, 5 pages.

The PCT Search Report and Written Opinion dated Mar. 5, 2020 for PCT Application No. PCT/US19/62558, 9 pages.

* cited by examiner

INTENSITY AND DEPTH MEASUREMENTS IN TIME-OF-FLIGHT SENSORS

BACKGROUND

Time-of-flight sensors may be unreliable in certain environments, e.g., environments with varied lighting and/or environments with objects having different reflectivity. Moreover, because time-of-flight sensors are often designed to detect objects in predetermined distance ranges, environments that include multiple objects at different distances may be difficult to interpret, e.g., due to ambiguity in the sensor returns. Such shortcomings may result in unreliable data, increased processing time to better understand the data, and/or decreased efficiency in identifying and/or characterizing objects that may be potential obstacles to safe travel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
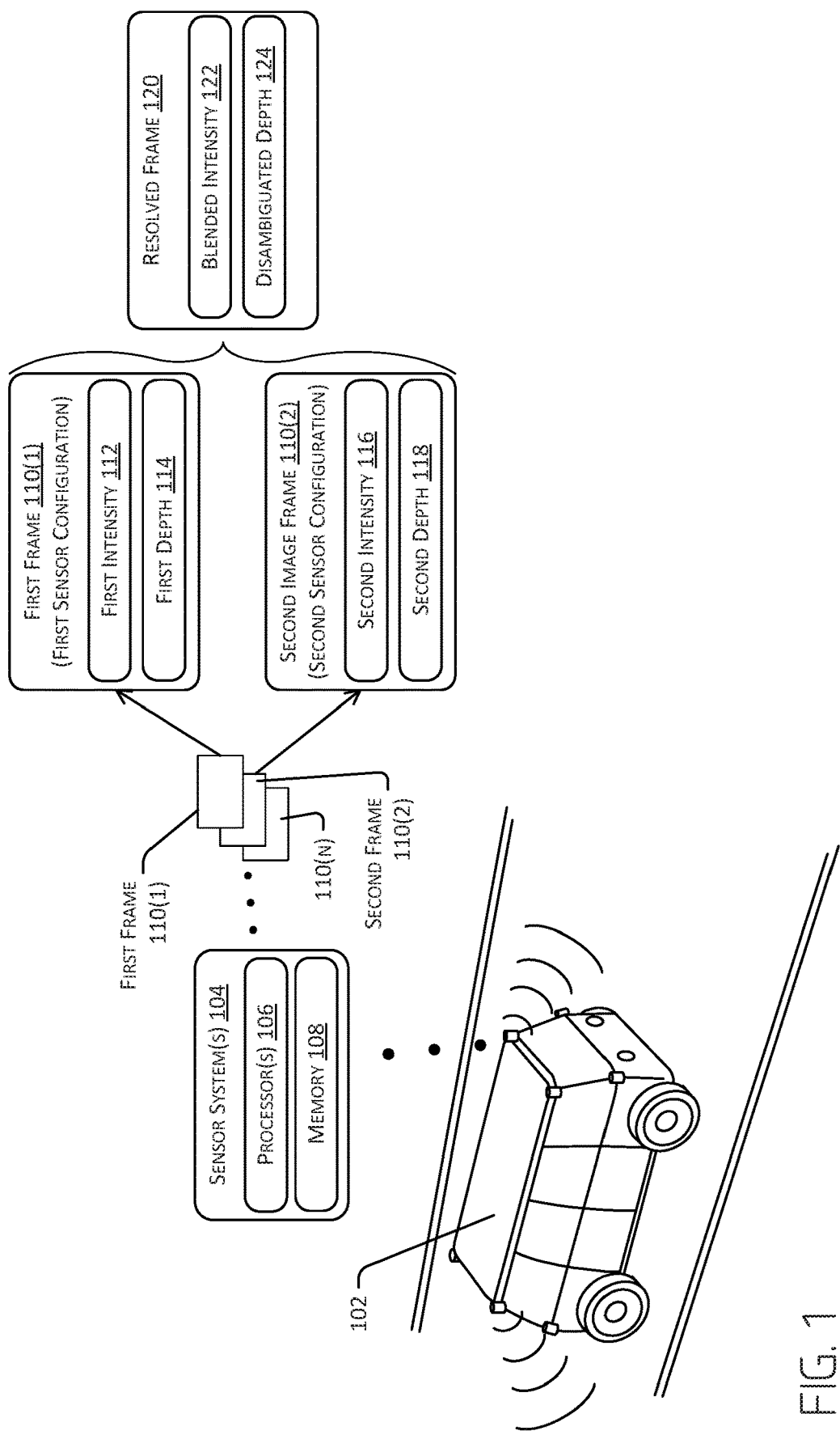
FIG. 1 illustrates an example vehicle, such as an autonomous vehicle, and example components of a sensor system associated with the vehicle, as described herein.

This disclosure describes methods, apparatuses, and systems for using sensor data to identify objects in an environment and for controlling a vehicle relative to those identified objects. For example, an autonomous vehicle can include a plurality of sensors to capture sensor data corresponding to an environment of a vehicle. The sensor data can include data associated with an environment where, in some instances, multiple objects (e.g., pedestrians, vehicles, bicyclists, etc.) are located. Oftentimes, different sensor modalities are used for redundancy purposes and/or because of inherent shortcomings in the sensors. For example, in the case of time-of-flight sensors, intensity and distance information may be unreliable due to one or more of oversaturation, under exposure, ambiguous returns, or the like. Techniques described herein can be used to improve sensor data, including time-of-flight sensor returns. For example, in implementations described herein, integration time altering techniques may be used to provide improved intensity data from time-of-flight sensor returns and/or disambiguation techniques may be used to more accurately determine distances associated with those returns. Such techniques may, in some instances, result in a better understanding of the environment of the vehicle, thereby leading to safer and/or more confident controlling of the vehicle.

As discussed herein, sensor data can be captured by one or more sensors, which can include time-of-flight sensors, RADAR sensors, LIDAR sensors, SONAR sensors, image sensors, microphones, or any combination thereof. The sensor can include an emitter to emit a signal and a sensor to sense a return signal from the environment. Further, the sensor can comprise a sensor computing device to determine a data format of the captured sensor data.

In the context of a time-of-flight (ToF) sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can be associated with the pixels (e.g., an intensity and depth value for each pixel) in the sensor data. The sensor computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, the sensor and/or the sensor computing device may vary attributes of the sensor and/or processes using the sensor to generate improved sensor data. For example, in some implementations, an integration time, e.g., the time over which the return signal is received, may be varied over different, e.g., consecutive, frames. The frames, captured using the two integration times, may then be blended to create a more robust image. In some examples, the intensity values from the two (or more) frames may be averaged per pixel. In other implementations, some pixels may be selected from the first image and others from the second image to create the image. In some examples, pixels above a threshold intensity value may be ignored, e.g., because they are saturated, or overexposed.

In alternative or additional examples, the carrier may be modified. For example, implementations described herein, the modulation frequency of the emitted carrier signal may be varied between successive frames. The modulation frequency may be varied in accordance with a range, e.g., a maximum unambiguous range of the sensor. By choosing modulation frequencies associated with different maximum unambiguous ranges, depth measurements larger than the maximum unambiguous ranges of the individual sensors can be disambiguated. Because of the disambiguation techniques described herein, for example, depths beyond the maximum range distance(s) associated with each modulation frequency may be reliably determined. In some examples, modulation frequencies may be chosen that are associated with coprime maximum unambiguous ranges, and depths up to the product of the ranges can be disambiguated with information from two successive frames.

In some implementations of this disclosure, different configurations for the time-of-flight sensor may be dynamically determined. For example, the integration time and/or an illumination power can be varied based on depth information. For instance, when the depth information indicates that objects are relatively far away, a next frame may be captured at a longer integration time and/or using a higher illumination power. Similarly, when the depth information indicates that the object is relatively closer, the sensor may be configured to capture a next frame at a lower integration time or at a lower illumination power, e.g., to limit overexposure or saturation.

In some examples, techniques described herein may also determine one or more confidence values associated with the intensity information and/or the depth information. For example, the confidence values may be sent with the image information to a planner system, such that the planner system can generate a map or other visualization of the environment. In other examples, the confidence values may be used in determining intensity values for combined images. For example, intensity values with a relatively higher confidence value may be more heavily weighted that intensity values with a relatively lower confidence value. Similarly, depth information and/or intensity information having a confidence level below a threshold value may be disregarded altogether.

In some examples, once characteristics of the environment are determined according to the techniques described herein, the computing device of the autonomous vehicle may determine one or more trajectories for proceeding relative to the object(s). In some instances, depth and/or intensity information generated according to techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a single, configurable sensor, to more accurately determine features of the objects. By capturing image data at different sensor configurations, depth data can be disambiguated. For example, techniques described herein may be faster and/or more robust than conventional techniques, as they may increase the reliability of depth and/or intensity information, alleviating the need for successive images. That is, techniques described herein provide a technological improvement over existing object detection, classification, prediction and/or navigation technology. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system in which sensor ambiguity and/or inconsistent sensor data exists may benefit from the techniques described. By way of non-limiting example, techniques described herein may be used on aircrafts, e.g., to identify and disambiguate depths associated with objects in an airspace or on the ground. Moreover, non-autonomous vehicles could also benefit from techniques described herein, e.g., for collision detection and/or avoidance systems.

FIGS. 1-5 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 can be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled. In some instances, the techniques can be implemented in any system using machine vision, and is not limited to vehicles.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions, for example, such that a first end of the vehicle 102 is the front end of the vehicle 102 when traveling in a first direction, and such that the first end becomes the rear end of the vehicle 102 when traveling in the opposite direction. Similarly, a second end of the vehicle 102 is the front end of the vehicle when traveling in the second direction, and such that the second end becomes the rear end of the vehicle 102 when traveling in the opposite direction. These example characteristics may facilitate greater maneuverability, for example, in small spaces or crowded environments, such as parking lots and/or urban areas.

A vehicle such as the example vehicle 102 can be used to travel through an environment and collect data. For example, the vehicle 102 can include one or more sensor systems 104. The one or more sensors can be, for example, one or more time-of-flight sensors, LIDAR sensors, RADAR sensors, SONAR sensors, image sensors, audio sensors, infrared sensors, location sensors, etc., or any combination thereof. Certain implementations described herein may be particularly well-suited for use with time-of-flight sensors, although other types of sensors also are contemplated. The sensors 104 may be disposed to capture sensor data associated with the environment. For example, the sensor data may be processed to identify and/or classify objects in the environment, e.g., trees, vehicles, pedestrians, buildings, road surfaces, signage, barriers, road marking, or the like.

As also illustrated in FIG. 1, the one or more sensor systems 104 can include one or more processors 106 and memory 108 communicatively coupled to the one or more processors 106. The processor(s) 106 and/or the memory 108 may be physically integrated into the sensor, e.g., as an SoC, FPGA, ASIC, or the like, or, in some implementations, the processor(s) 106 and/or the memory 108 may be available to, e.g., connected to receive signals from and/or send signals to, the sensor system(s) 104. As discussed above, the one or more sensor system(s) 104 can determine the sensor data in various formats (e.g., a quadrature format, an intensity and depth format, and/or an unprojected format) using the one or more processors 106.

In the example of FIG. 1, the sensor system may include a time-of-flight sensor, which may be configured to emit a carrier (e.g., a signal) and receive, e.g., capture, a response carrier (e.g., a response signal) comprising the carrier reflected off a surface in the environment. The time-of-flight sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as depth image. For example, using the sensor data, the sensor system can determine depth and intensity values for each point associated with an object in an environment. In still further examples, the sensor system(s) can also determine the sensor data in an unprojected format. For example, an unprojection can refer to a transformation from a two-dimensional frame of reference into a three-dimensional frame of reference, while a projection can refer to a transformation from a three-dimensional frame of reference into a two-dimensional frame of reference. In some instances, processing techniques can determine a relative location of the sensor system(s) 104 (e.g., relative to one or more other sensors or systems) and can unproject the data into the three-dimensional representation based at least in part on the intensity and depth format, intrinsic and extrinsic information associated with the sensor system(s) 104 (e.g., focal length, center, lens parameters, height, direction, tilt, distortion, etc.), and the known location of the sensor system(s) 104. In some instances, the point can be unprojected into the three-dimensional frame, and the distances between the sensor system(s) 104 and the points in the three-dimensional frame can be determined (e.g., <x, y, z>).

As also illustrated in FIG. 1, the sensor system(s) 104 may be configured to output the sensor data, e.g., the intensity and depth information, the quadrature values, or the like, as a series of frames 110, e.g., image frames. For instance, the frames 110 can include a stream of serially-generated (e.g., at a predetermined interval) frames including a first frame 110(1), a second frame 110(2), through an nth frame 110(N). Generally, each of the frames 110 may include the same type of data, e.g., data related to the intensity and depth information for each of a plurality of pixels comprising the receiver of the sensor, but techniques described herein may vary aspects of the sensor such that the data is captured at different sensor configurations. For example, as illustrated in FIG. 1, the first frame 110(1) includes first intensity information 112 and first depth data 114 captured at a first sensor configuration. Similarly, the second frame 110(2) includes second intensity information 116 and second depth information 118 captured at a second sensor configuration.

Techniques described herein can generate composite or blended data from multiple frames, e.g., from two or more of the frames 110. For example, the composite or blended data may better represent the environment and/or may have a higher associated confidence. For instance, and as illustrated in FIG. 1, data associated with the first frame 110(1), e.g., the first intensity information 112 and the first depth information 114, and data associated with the second frame 110(2), e.g., the second intensity information 116 and the second depth information 118, may be used to generate a third, or resolved frame 120, e.g., a resolved image frame.

For instance, the resolved frame 120 may include, for each of plurality of pixels, blended intensity information 122, e.g., determined based on the first intensity information 112 and/or the second intensity information 116, and/or disambiguated depth information 124, e.g., determined based at least in part on the first depth information 114 and the second depth information 118. In other examples, more than the data associated with first frame 110(1) and the second frame 110(2) may be used to generate the resolved frame 120.

As noted above, the first frame 110(1) includes data captured by the sensor system 104 at an associated first configuration and the second frame 110(2) includes data captured by the sensor system 104 at an associated second configuration. In some examples, the different configurations of the sensor system 104 may have different integration, or exposure, times. With regard to determining the blended intensity information 122, for example, the first intensity information 112 may correspond to data captured using a first integration time and the second intensity information 116 may correspond to data captured using a second integration time. By processing the received light information over different integration times, each of the first frame 110(1) and the second frame 110(2) may be better suited for imaging different objects in the environment. For example, objects that are farther away and/or are less reflective (e.g., Lambertian surfaces) may be better imaged with a longer integration time, whereas objects that are closer or that are more reflective may be subject to over exposure, e.g., pixels may be oversaturated, for that same relatively longer integration time. Instead, objects that are relatively closer and/or more reflective may be better imaged with a shorter integration time, whereas object that are farther away and/or less reflective may be underexposed over the relatively shorter integration time. The blended intensity information 122 can then be determined based on the different intensity information, e.g., the first intensity information 112 and the second intensity information 116. For instance, pixels that may be unreliable, e.g., because they may be oversaturated, underexposed, or the like, in either the first frame 110(1) or the second frame 110(2) can be replaced with pixels from the other of the first frame 110(1) or the second frame 110(2) to generate the resolved frame 120. For instance, pixels that are over 80% or 90% saturated may be disregarded in favor of corresponding pixels from another frame that are below that threshold.

In other implementations, the blended intensity information 122 can be an average of intensity values from the first frame 110(1) and the second frame 110(2). For example, each pixel in the resolved frame 120 may have an intensity that is the average of corresponding pixels in the first frame 110(1) and the second frame 110(2). In such examples, the pixels may not be disregarded, but instead averaged. Averaging the intensity information 112, 116 may include performing a weighted average, e.g., with the intensity information 112, 116 being weighted by a weighting factor. The weighting factor may be associated with the intensity value, with a confidence value associated with the intensity information, or based one or more additional factors. For instance, pixels having an intensity equal to or below a first threshold (e.g., underexposed pixels) and/or equal to or above a second threshold (e.g., overexposed pixels) may be less reliable and thus may be more lightly weighted than values between the first threshold and the second threshold.

In some examples, instead of, or in addition to, receiving the first intensity information 112 and the second intensity information 116 at different integration times, implementations described herein may also or alternatively vary the intensity of the light source associated with the sensor system 104. For instance, increasing the power at which the light is emitted from the sensor system 104 may have an effect similar to increasing the integration time. Specifically, objects that are farther away and/or less reflective may be better imaged with a light source that is more powerful, e.g., with a higher intensity light source. For example, the sensor system 104 may also have an adjustable intensity at which the light is emitted and the first frame 110(1) may be captured at a first emitted intensity and the second frame 110(2) may be captured at a second emitted intensity. As noted above, intensity values from the image frames 110(1), 110(2) may then be combined to create the blended intensity information 122 for the resolved frame 120.

In addition to improving intensity information, using information from the first frame 110(1) and the second frame 110(2) may also provide more accurate depth information. In implementations described herein, the modulation frequency of the carrier signal may be different for each of the image frames 110(1), 110(2). Time-of-flight sensors generally determine depth of an object by determining a phase shift of the reflected carrier signal, relative to the emitted carrier signal. The value of the phase shift directly corresponds to the depth of the object relative to the sensor system 104. The modulation frequency of the time-of-flight sensor generally is determined based on a maximum distance at which objects are expected to be. However, because the carrier signal repeats itself every period, e.g., the wave may be a sinusoid or the like, the returned depth may be ambiguous. By way of non-limiting example, the modulation frequency of the time-of-flight sensor may be chosen to determine depths of up to 5 meters. Thus, a phase shift of 30-degrees may correspond to a 2-meter depth, for example. However, that 2-meters may be a modulus associated with the phase shift, and in fact, the distance may be 7-meters, or 12-meters, or some different depth. Techniques described herein can disambiguate the depth by acquiring additional depth information, e.g., the second depth information 118, at a different modulation frequency. Using the example above, the first depth information 114 may be the 2-meters determined using the modulation frequency associated with the maximum distance of 5-meters, and the second depth information 118 may be determined based on a second modulation frequency that, in this example, corresponds to a maximum distance of 3 meters. The phase shift measured at the second modulation frequency may correspond to a distance of 1-meter. However, because of the ambiguity discussed above, that 1-meter may be a modulus, and thus the depth may be 1-meter, 4-meters, 7-meters, 10-meters, 13-meters, etc. Because both depth measurements, at the two modulation frequencies, have a candidate depth of 7-meters, but the other candidate depths do not align, techniques described herein determine the disambiguated depth 124 to be 7-meters. Accordingly, techniques described herein can determine first candidate depths for the first depth information 114 associated with the first modulation frequency and second candidate depths for the second depth information 118 associated with the second modulation frequency and determine the disambiguated depth 124 as the depth that corresponds to both one of the first candidate depths and one of the second candidate depths.

In practice, the first modulation frequency and the second modulation frequency may be chosen based on their associated maximum depths. For instance, by selecting two maximum depths that are coprime, e.g., 3 and 5 in the example above, depths up to the product of the two maximum depths (15-meters in the example) can be disambiguated. In other implementations in which coprime numbers are not used, the depth to which values can be disambiguated may correspond to the lowest common multiple of the two depths.

In the example of FIG. 1, the first frame 110(1) and the second frame 110(2) may be consecutive image frames 110 captured by the sensor system(s) 104. In other embodiments, however, the two frames, e.g., the first frame 110(1) and the second frame 110(2) used to determine attributes of the resolved frame 120 may not be consecutive frames. Moreover, the techniques described herein may use more than two frames. For example, the blended intensity 122 may an average of values from three or more image frames.

Figure 2:
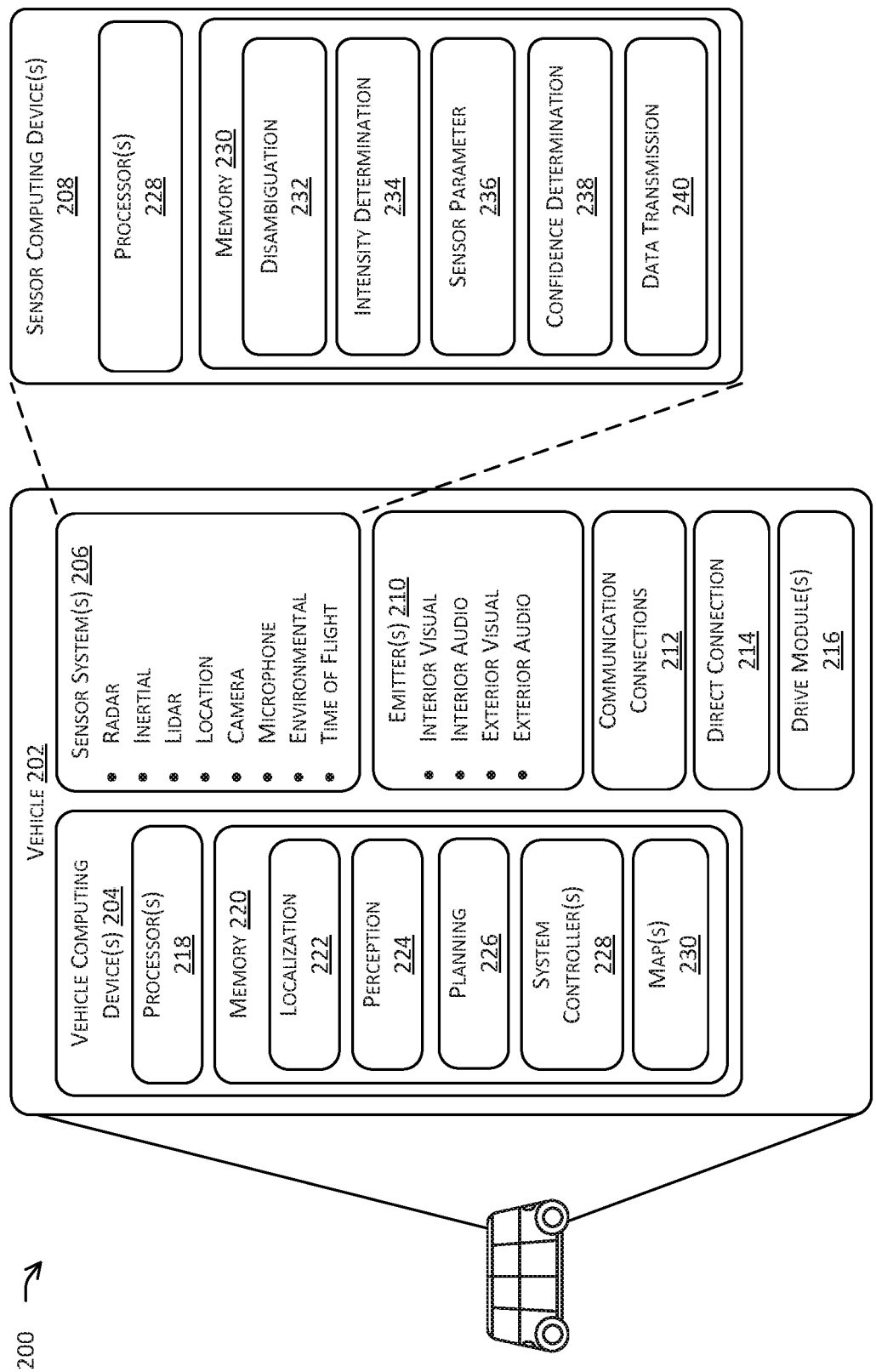
FIG. 2 depicts a block diagram of an example computing system for generating depth and intensity data, as described herein.

FIG. 2 depicts a block diagram of an example system 200 for implementing the techniques discussed herein. In at least one example, the system 200 can include a vehicle 202, which can be similar to (or the same as) the vehicle 102 described above with reference to FIG. 1. In the illustrated example 200, the vehicle 202 is an autonomous vehicle; however, the vehicle 202 can be any other type of vehicle.

The vehicle 202 can include one or more computing devices 204, one or more sensor systems 206, which may include one or more sensor computing devices 208, one or more emitter(s) 210, one or more communication connections 212, at least one direct connection 214 (e.g., for physically coupling with the vehicle 202 to exchange data and/or to provide power), and one or more drive modules 216. In some instances, the vehicle 202 can include more or fewer instances of the computing device(s) 204. The one or more sensor systems 206 can be configured to capture sensor data associated with an environment.

The vehicle computing device(s) 204 can include one or more processors 218 and memory 220 communicatively coupled with the one or more processors 218. In at least one instance, the one or more processors 218 can be similar to the processor 106 and the memory 220 can be similar to the memory 108 described above with reference to FIG. 1. In the illustrated example, the memory 220 of the computing device(s) 204 stores a localization component 222, a perception component 224, a planning component 226, one or more system controllers 228, and one or more maps 230. Though depicted as residing in the memory 220 for illustrative purposes, it is contemplated that the localization component 222, the perception component 224, the planning component 226, and the one or more system controllers 228 can additionally, or alternatively, be accessible to the computing device(s) 204 (e.g., stored in a different component of vehicle 202 and/or be accessible to the vehicle 202 (e.g., stored remotely)).

In at least one example, the localization component 222 can include functionality to receive data from the sensor system(s) 206 to determine a position of the vehicle 202. In instances described herein, in which the sensor system(s) include(s) a time-of-flight sensor, the localization component 222 can receive data, e.g., raw data, such as quadrature data, processed data, such as intensity and/or depth information, or the like. In other implementations, the localization component 222 can include and/or request/receive a three-dimensional map, e.g., of the map(s) 230 of an environment and can continuously determine a location of the autonomous vehicle within the map. In some instances, the localization component 222 can use SLAM (simultaneous localization and mapping) or CLAMS (calibration, localization and mapping, simultaneously) to receive image data, such as from the time-of-flight sensor, LIDAR data, RADAR data, SONAR data, IMU data, GPS data, wheel encoder data, or any combination thereof, and the like to accurately determine a location of the autonomous vehicle 202. In some instances, the localization component 222 can provide data to various components of the vehicle 202 to determine an initial position of an autonomous vehicle for generating a candidate trajectory, as discussed herein.

In some examples, the perception component 224 can include functionality to perform object detection, segmentation, and/or classification. In some examples, the perception component 224 can provide processed sensor data that indicates a presence of an entity that is proximate to the vehicle 202 and/or a classification of the entity as an entity type (e.g., car, pedestrian, cyclist, building, tree, road surface, curb, sidewalk, unknown, etc.). In additional and/or alternative examples, the perception component 224 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning component 226 can determine a path for the vehicle 202 to follow to traverse through an environment. For example, the planning component 226 can determine various routes and trajectories and various levels of detail. For example, the planning component 226 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 226 can generate an instruction for guiding the autonomous vehicle along at least a portion of the route from the first location to the second location. In at least one example, the planning component 226 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 226 can alternatively, or additionally, use data from the perception component 224 to determine a path for the vehicle 202 to follow to traverse through an environment. For example, the planning component 226 can receive data from the perception component 224 regarding objects associated with an environment. Using this data, the planning component 226 can determine a route to travel from a first location (e.g., a current location) to a second location (e.g., a target location) to avoid objects in an environment.

In at least one example, the computing device(s) 204 can include one or more system controllers 228, which can be configured to control steering, propulsion, braking, safety, emitters, communication, and other systems of the vehicle 202. These system controller(s) 228 can communicate with and/or control corresponding systems of the drive module(s) 216 and/or other components of the vehicle 202, which may be configured to operate in accordance with a trajectory provided from the planning system 226.

In some examples, the one or more maps 230 can be stored on a remote computing device. In some examples, multiple maps 230 can be stored based on, for example, a characteristic (e.g., type of entity, time of day, day of week, season of the year, etc.). Storing multiple maps 230 can have similar memory requirements, but increase the speed at which data in a map can be accessed.

In at least one example, the sensor system(s) 206 can be similar to the sensor system(s) 104 described above with reference to FIG. 1. The sensor system(s) 106 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 206 can include multiple instances of each of these or other types of sensors. For instance, the time-of-flight sensors can include individual time-of-flight sensors located at the corners, front, back, sides, and/or top of the vehicle 202. As another example, the camera sensors can include multiple cameras disposed at various locations about the exterior and/or interior of the vehicle 202. The sensor system(s) 206 can provide input to the computing device(s) 204.

The sensor system(s) 206 can include the sensor computing device(s) 208, which can include one or more processors 228 and memory 230 communicatively coupled with the one or more processors 228. The one or more processors 228 can be similar to the processor(s) 106 and/or the processor(s) 218 and/or the memory 230 can be similar to the memory 108 and/or the memory 220, described above. In the illustrated example, the memory 230 of the sensor system(s) 206 can store a disambiguation component 232, an intensity determination component 234, a sensor parameter component 236, a confidence determination component 238, and a data transmission component 240. Though depicted as residing in the memory 230 for illustrative purposes, it is contemplated that the disambiguation component 232, the intensity determination component 234, the sensor parameter component 236, the confidence determination component 238, and/or the data transmission component 240 can additionally, or alternatively, be accessible to the sensor system(s) 206 (e.g., stored in a different component of vehicle 202 and/or be accessible to the vehicle 202 (e.g., stored remotely)). Moreover, although the disambiguation component 232, the intensity determination component 234, the sensor parameter component 236, the confidence determination component 238, and the data transmission component 240 are illustrated as being stored in and/or part of the sensor computing device(s) 208, in other implementations any or all of these components may be stored in the memory 220. That is, although FIG. 2 illustrates several components as being part of the sensor system(s) 206, the processing associated with any or all of those components may be performed other than at the sensor. In one example, the sensor system 206 may output raw data, e.g., the quadrature data discussed above, for processing in accordance with functionality ascribed herein to one or more of the disambiguation component 232, the intensity determination component 234, the sensor parameter component 236, the confidence determination component 238, and/or the data transmission component 240, but that processing may be performed other than at the location of the emitter and the receiver.

The sensor computing device(s) 208, including the disambiguation component 232, the intensity determination component 234, the sensor parameter component 236, the confidence determination component 238, and/or the data transmission component 240 may be configured to generate and/or process data in many formats. For example, and as noted above, the sensor computing device(s) 208 can measure a phase shift between the carrier and the response carrier and/or perform numerical integration calculations to determine the sensor data in the quadrature format. In other examples, the sensor computing device(s) 208 can determine an intensity and depth format of the sensor data. For purposes of illustration only, the sensor system(s) 206 can determine the sensor data in the intensity and depth format where an individual pixel in the sensor data is associated with an 8-bit value for the intensity and a 12-bit value for the depth.

In some implementations, the sensor computing device(s) 208 can also determine the sensor data in an unprojected format. For example, an unprojection can refer to a transformation from a two-dimensional frame (or a 2.5-dimensional frame) of reference into a three-dimensional frame of reference or a three-dimensional surface, while a projection can refer to a transformation from a three-dimensional frame of reference into a two-dimensional frame of reference. In some instances, techniques described herein can determine a location of the sensor system(s) 206 relative to the three-dimensional surface and unproject the data into the three-dimensional frame based at least in part on the depth information, pixel coordinate, intrinsic and extrinsic information associated with the sensor system(s) 206 (e.g., focal length, center, lens parameters, height, direction, tilt, etc.), and the known location of the sensor system(s) 206. In some instances, the depth information can be unprojected into the three-dimensional frame, and the distances between the sensor system(s) 206 and the various object contact points unprojected into the three-dimensional frame can be determined. In some instances, the unprojected three-dimensional points can correspond to a detailed map representing an environment that has been generated or built up over time using measurements from the sensor system(s) 206 or other mapping software and/or hardware. Because locations of the object contact points are known with respect to a three-dimensional surface, as the object moves over time (and accordingly, as various frames of object contact points are captured over time), various observations about the object such as orientation, length, width, velocity, etc. also can be determined over time.

As used herein, the term "unproject," "unprojected," or "unprojecting" can refer to a conversion of two-dimensional data into three-dimensional data, while in some cases, the term "project," "projected," or "projecting" can refer to a conversion of three-dimensional data into two-dimensional data. In some instances, determining the various formats of sensor data (e.g., the quadrature format, the intensity and depth format, and the unprojected format) can require different amounts of computational resources to determine and/or require different amounts of bandwidth to transmit.

The disambiguation component 232 can be configured to receive depth information over multiple frames and determine a depth of objects according to those frames. For example, as detailed herein, depth returns at a time-of-flight sensor may be ambiguous, and the disambiguation component 232 may disambiguate those returns. In some examples, the disambiguation component 232 may receive for individual pixels in a frame, depth information. A first frame may be associated with a first modulation frequency and a second frame may be associated with a second modulation frequency, different from the first modulation frequency. For example, each of the modulation frequencies may be between about 5-megahertz and about 50-megahertz. The disambiguation component 232 can determine first candidate depths (e.g., distances) based on the depth data captured at the first modulation frequency and second candidate depths (e.g., distances) based on the depth data captured at the second modulation frequency. The disambiguation component 232 may determine the depth corresponding to one of the first candidate depths and to one of the second candidate depths as an actual depth for each pixel. In some examples, the first modulation frequency and the second modulation frequency may be determined based on a non-ambiguous range associated with each. For example, the non-ambiguous range may be inversely proportional to the modulation frequency. The modulation frequency may also determine the wavelength of the carrier signal. In some examples, the first modulation frequency may be associated with a first non-ambiguous range and the second modulation frequency may be associated with a second non-ambiguous range different from the first non-ambiguous range. The first non-ambiguous range and the second non-ambiguous range may be coprime, for example. As will also be appreciated, sensor data captured for a modulation frequency resulting in a relatively larger non-ambiguous range will have more error than sensor data captured for a modulation frequency resulting in a relatively shorter non-ambiguous range. In implementations described herein, the disambiguation component 232 can further disambiguate the depth using error measurements for the two (or more) modulation frequencies, e.g., by weighting more heavily the return from the modulation frequency with the lower non-ambiguous range.

The intensity determination component 234 can determine a blended or resolved intensity for a plurality of image frames. For example, the intensity determination component 234 can receive the first intensity information 112 and the second intensity information 116 and determine the blended intensity 122. In some instances, the blended intensity may comprise, on a pixel-by-pixel basis, an average of the first intensity information 112 and the second intensity information 116. Similarly, the intensity determination component may average values from more than two image frames. In other examples, the blending may be done according to some other function, such as, but not limited to a weighted average. For example, and as described further herein, sensor data generated for individual pixels may have an associated confidence value, and the confidence value may be used to weight the read intensity values. In additional configurations, the intensity determination component 234 may ignore or disregard intensity information from one of the captured image frames. For example, the intensity determination component may disregard intensity information for select pixels when the intensity value is above a first threshold or below a second threshold. For example, a particularly high intensity may result from pixel oversaturation and/or intensity returns below a lower threshold may be subject to increased noise and/or anomalies, and thus unreliable.

The sensor parameter component 236 can determine and/or instruct different configurations for the sensor system(s) 206. For example, the sensor system(s) 206 can include one or more time-of-flight sensors that generally function by emitting a carrier signal and receiving a response carrier signal as the carrier signal reflects off of objects in the environment. As described herein, varying parameters of the time-of-flight sensor(s) can result in acquiring data at different configurations, which data can then be processed for improvements to conventional systems. The sensor parameter component 236 can cause the sensor to alter the modulation frequency of the emitted carrier signal, for example. As described herein, depth measurements captured at different modulation frequencies may allow for ready disambiguation of otherwise-ambiguous depth returns.

The sensor parameter component 236 can also cause other modifications to parameters of the sensor system(s) 206. For instance, the sensor parameter component 236 can configure the sensor system(s) 206 (e.g., by directly altering settings of the sensor and/or by sending signals to the sensor that cause settings to change) to vary the integration time of sensor system(s) 206 and/or the intensity of the output illumination. As detailed herein, a longer integration time and/or a higher illumination power may allow for imaging of relatively farther and/or relatively less-reflective objects in the environment. Similarly, a shorter integration time and/or a lower illumination power may be desirable for imaging closer and/or more reflective objects, e.g., to avoid oversaturation of pixels at the receiver. In implementations of this disclosure, the sensor parameter component 236 may cause the sensor system(s) 206 to alter the integration time and/or the illumination power in successive frames, such that intensity information is acquired at two different configurations. The intensity information for the different frames may then be resolved by the intensity determination component 234.

In some implementations, the sensor parameter component 236 may include functionality that causes parameters or attributes of the sensor system(s) 206 to vary in a predetermined manner. For instance, the modulation frequency of the emitted carrier signal may vary from frame-to-frame, e.g., by alternating between two predetermined modulation frequencies. However, in other implementations, the sensor parameter component 236 may dynamically change parameters of the sensor system(s) 206. For instance, and as described further in connection with FIG. 4, the sensor parameter component may vary the integration time and/or the illumination power based at least in part on a determined depth of objects in the environment. For example, the sensor parameter component 236 may receive one or more determined depths from the disambiguation component 232 and determine parameters for collecting image data based thereon. For example, when information from the disambiguation component 232 indicates that most objects in the environment are at a relatively far distance, the sensor parameter component 236 may configure the sensor system(s) 206 to increase the integration time and/or the illumination power. In some implementations, the sensor parameter component 236 could also or alternatively receive information from other sources, e.g., other sensors, including sensors of different modalities. By way of non-limiting examples, the sensor parameter component 236 could receive depth information and/or intensity information from a LiDAR sensor, depth information from a radar sensor, intensity information from an image, or the like, and use that information in addition to or instead of the disambiguated depth. In another example, depth information from the disambiguation component 232 may indicate that several objects, at varied depths, are present in the environment, and based on this information, the sensor parameter component 236 may control the sensor system(s) 206 to capture frames at varied configurations. The data from the varied configurations may then be combined, e.g., by the intensity determination component 234, to provide an improved representation of the environment when compared to a single frame at a single integration time and a single illumination power. Moreover, when multiple depths are detected, the sensor parameter component may instruct more than two sensor configurations and/or may signal the intensity determination component 234 to consider more than two frames in creating a composite image.

The confidence determination component 238 can determine one or more confidence values associated with the sensor data. For example, various factors may influence whether the sensor returns are reliable, and the confidence determination component 238 may make such determinations. For example, the confidence determination component 238 can determine that intensity data having a value above a first threshold may have a lower confidence score, e.g., because the pixel may be overexposed or saturated. Similarly, underexposed pixels may have a low confidence score. In other embodiments, the confidence determination system 238 can determine that depth information received at a relatively lower modulation frequency may be more reliable than depth information received at a relatively higher modulation frequency. In some examples, confidence determination may be related to a depth determination (e.g., inversely proportional). In examples, the confidence may be used to account for noise and/or other anomalies in the return signal. In some instances, intensities below 20% and above 80% may be deemed relatively unreliable, and therefore have an associated lower confidence score. The confidence determination component 238 can also or alternatively be configured to determine confidence values associated with the depth determinations made by the disambiguation component 232. For example, the confidence determination component 238 may ascribe a higher confidence value to a determined depth when the depth information from two different modulation frequencies are relatively closer than when the same depth information is not so clearly disambiguated.

The data transmission component 240 can transmit the sensor data from the sensor computing device(s) 208, e.g., to the localization component 222, the perception component 224, and/or the planning component 226.

The vehicle 202 can also include one or more emitter(s) 210 for emitting light and/or sound, as described above. The emitter(s) 210 in this example include interior audio and visual emitters to communicate with passengers of the vehicle 202. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 210 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 202 can also include one or more communication connection(s) 212 that enable communication between the vehicle 202 and one or more other local or remote computing device(s). For instance, the communication connection(s) 212 can facilitate communication with other local computing device(s) on the vehicle 202 and/or the drive module(s) 216. Also, the communication connection(s) 212 can allow the vehicle to communicate with other nearby computing device(s) (e.g., other nearby vehicles, traffic signals, etc.). The communications connection(s) 212 can also enable the vehicle 202 to communicate with a remote teleoperations computing device or other remote services.

The communications connection(s) 212 can include physical and/or logical interfaces for connecting the computing device(s) 204 to another computing device or an external network (e.g., the Internet). For example, the communications connection(s) 212 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 can include one or more drive modules 216. In some examples, the vehicle 202 can have a single drive module 216. In at least one example, if the vehicle 202 has multiple drive modules 216, individual drive modules 216 can be positioned on opposite ends of the vehicle 202 (e.g., the front and the rear, etc.). In at least one example, the drive module(s) 216 can include one or more sensor systems to detect conditions of the drive module(s) 216 and/or the surroundings of the vehicle 202. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 216. In some cases, the sensor system(s) on the drive module(s) 216 can overlap or supplement corresponding systems of the vehicle 202 (e.g., sensor system(s) 206).

The drive module(s) 216 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 216 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 216. Furthermore, the drive module(s) 216 also include one or more communication connection(s) that enable communication by the respective drive module with one or more other local or remote computing device(s).

The processor(s) 218 of the vehicle 202, the processor(s) 228 of the sensor computing device(s), and/or the processor(s) 106 of the sensor system(s) 104 can be any suitable processor capable of executing instructions to process data and perform operations as described herein. By way of example and not limitation, the processor(s) 218, 228, 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 220, 230, 108 are examples of non-transitory computer-readable media. The memory 220, 230, 108 can store an operating system and one or more software applications, instructions, programs, and/or data to implement the methods described herein and the functions attributed to the various systems. In various implementations, the memory 220, 230, 108 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 220, 230, 108 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

Figure 3:
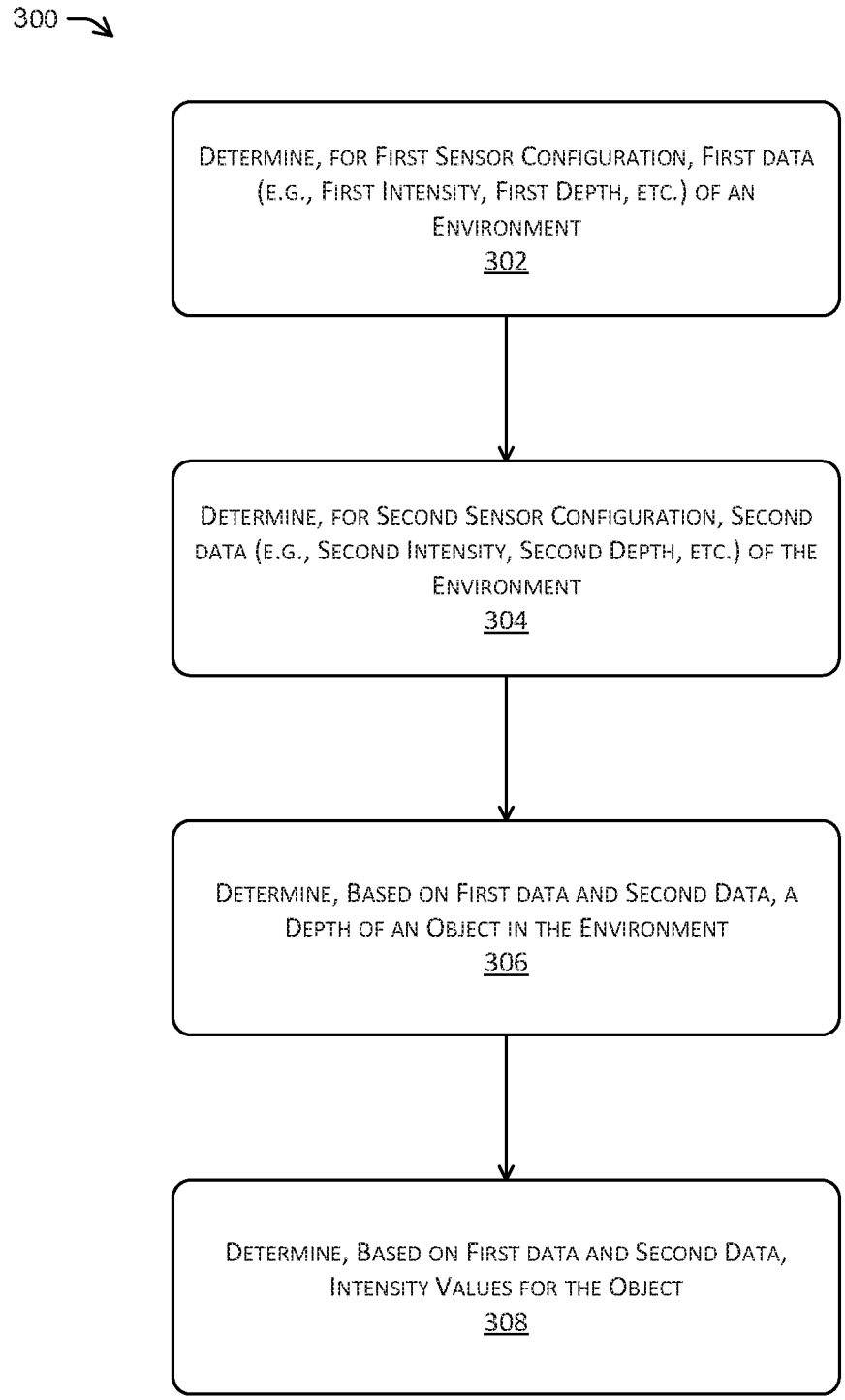
FIG. 3 is a flowchart illustrating an example method for controlling a sensor, such as a time-of-flight sensor, to improve intensity and/or depth information captured by the sensor, as described herein.
Figure 4:
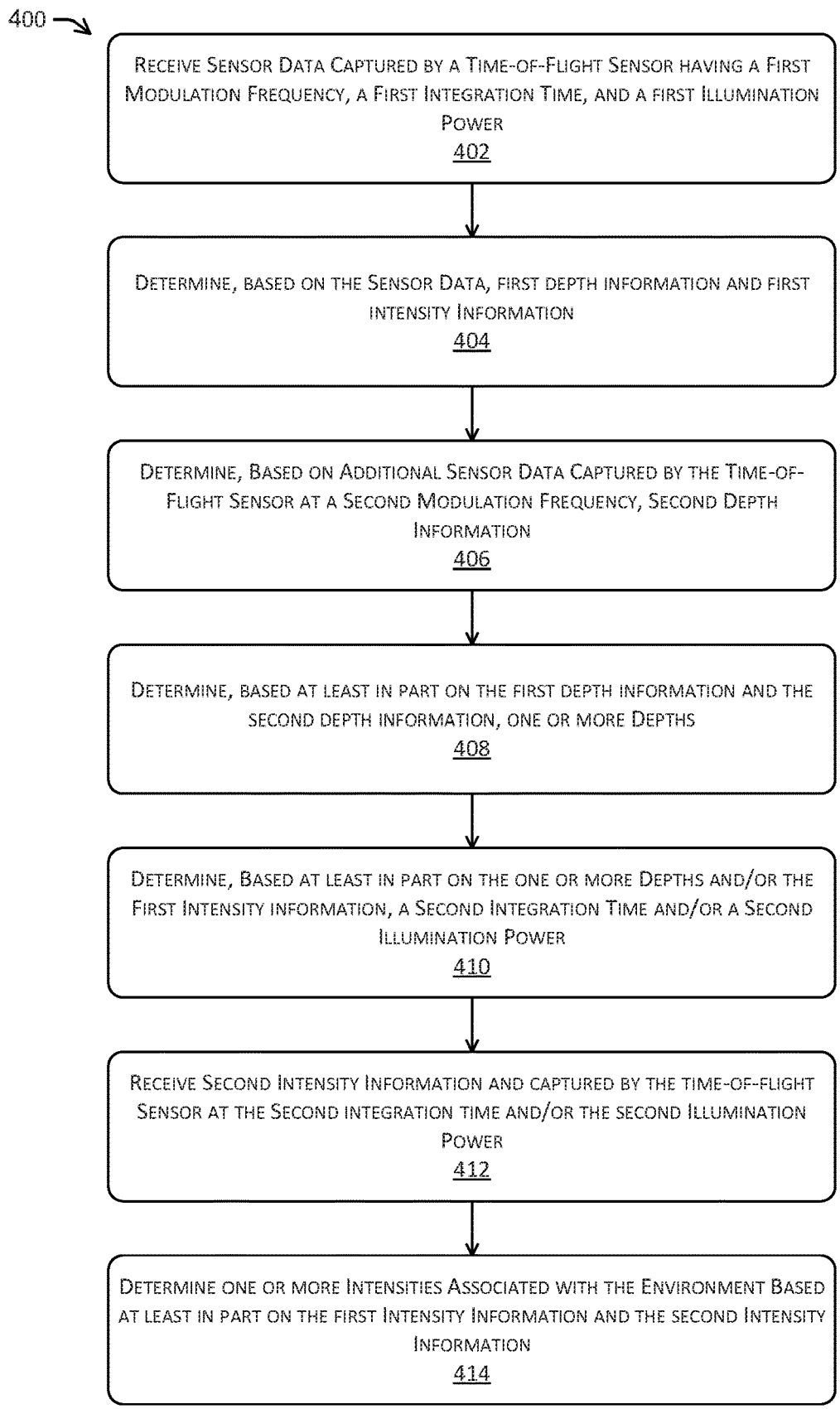
FIG. 4 is a flowchart illustrating another example method for controlling a sensor, such as a time-of-flight sensor, to improve intensity and/or depth information captured by the sensor, as described herein.
Figure 5:
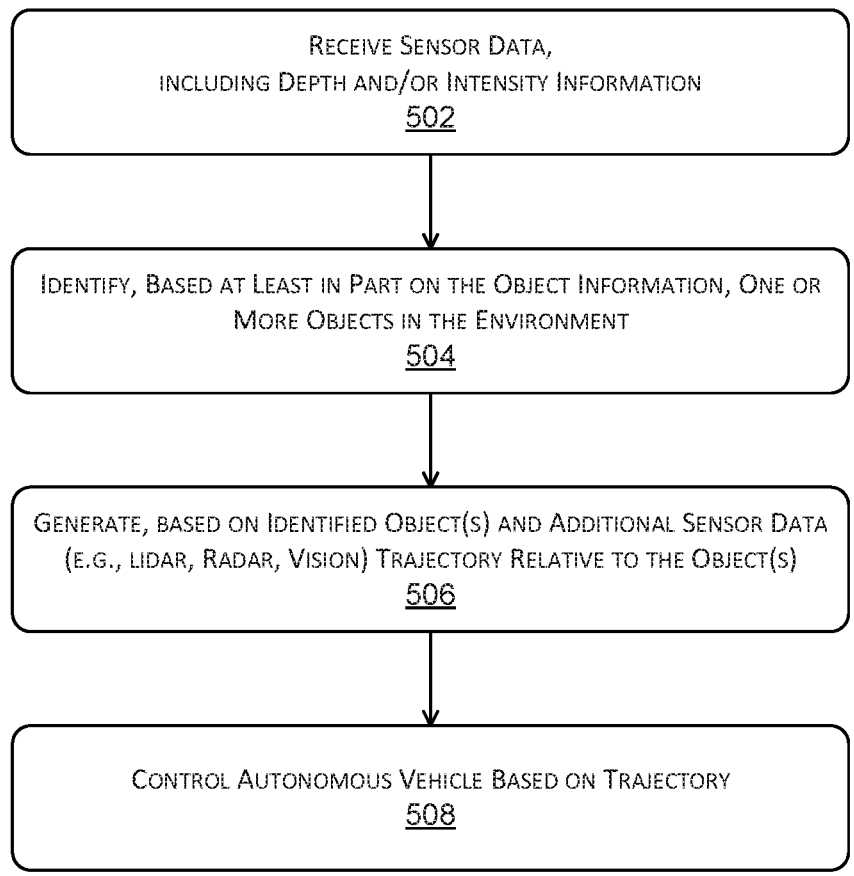
FIG. 5 is a flowchart illustrating an example method for controlling a vehicle relative to obstacles sensed at least in part by a time-of-flight sensor, as described herein.

FIGS. 3, 4, and 5 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 3 depicts an example process 300 for sensing objects in an environment using a sensor system. For example, some or all of the process 300 can be performed by the sensor system 104 and/or by one or more components illustrated in FIG. 2, as described herein. For example, some or all of the process 300 can be performed by the sensor system(s) 206, including, but not limited to, the disambiguation component 232, the intensity determination component 234, the sensor parameter component 236, and/or the confidence determination component 238.

At operation 302, the process 300 includes determining, for a first sensor configuration, first data, e.g., first intensity information, first depth information, or the like, for an environment. For example, techniques described herein may be useful for improving and/or interpreting sensor data received from a time-of-flight sensor. In these examples, the time-of-flight sensor generates raw data in the form of quadrature data, which may be used to determine depth and/or intensity values for pixels of a receiver of the time-of-flight sensor. So, for example, the operation 302 may include receiving the quadrature data, e.g., as a group of four frames, each corresponding to one of four different phases of reading return signals, and processing those four frames to generate a single frame, e.g., the first frame 110(1), the second frame 110(2), or the like. The single frame includes intensity and depth data for each pixel in the frame. In some implementations, the sensor system 204 may include the processor 228, e.g., as an FPGA, an SoC, an ASIC, or the like.

As noted, the first data is captured at a first sensor configuration. For example, the configuration may include a first integration time, a first illumination power, and/or a first modulation frequency. As described herein, the integration time and the illumination power may be configurable to obtain improved intensity data for the reflected light received at the receiver of the sensor. The modulation frequency may be used to determine a depth at which the carrier signal is reflected, and thereby a depth of an object in the environment.

At operation 304, the process 300 can include determining, for a second sensor configuration, second image data, e.g., second intensity information, second depth information, or the like, for the environment. Thus, the operation 304 may be substantially the same as the operation 302, but the data may be captured at a second configuration different from the first configuration. In some examples, the second configuration may include at least a different modulation frequency and a different integration time. Moreover, the second configuration may also or alternatively include a different illumination power. In some examples, the first image data may represent a first image frame, e.g., the first frame 110(1) and the second image data may represent second image frame, e.g., the second frame 110(2). In some examples, the first image frame and the second image frame may be successive image frames in a stream of image frames captured by the sensor.

At operation 306, the process 300 can include determining, based on the first image data and the second image data, a depth of an object in the environment. For example, the sensor computing device(s) 208, e.g., using the disambiguation component 232, can disambiguate the first depth information, acquired at the first modulation frequency, and the second depth information, acquired at the second modulation frequency. In some examples, each of the modulation frequencies may be associated with a different range or distance, e.g., a non-ambiguous range. For example, when the two ranges are coprime, depth values can be disambiguated up to the product of the two different ranges.

At operation 308, the process 300 can include determining, based on the first image data and the second image data, intensity values for the object. For example, the sensor computing device(s) 208, e.g., using the intensity determination component 234, can combine the first intensity information, acquired at the first integration time and/or the first illumination power, with the second intensity information, acquired at the second integration time and/or the second illumination power to determine a composite image with better resolution. For example, the first image data may better image relatively closer and/or more reflective objects, whereas the second image data may better image relatively farther away and/or less reflective object, and combining the image, e.g., on a pixel-by-pixel basis, may result in a composite image that features the respective strengths of the two images, and lessens the impact of the relatively weaker portions of the image. For instance, the intensity information may be averaged (and in some examples a weighted average), on a per-pixel basis, to achieve a blended result, such as the blended intensity 122 of the resolved frame 120.

Although examples used to discuss FIG. 3 have included using one first frame, captured at a first sensor system configuration, and one second frame, captured at a second sensor system configuration, to determine information about objects in the environment, other implementations may consider more frames. For example, the first frame and the second frame may be used to determine the blended intensity, but one or more different frames may be used to disambiguate the depth values. For instance, the first and second frames may have the same modulation frequency, but a third frame may have a different modulation frequency, and thus the first and third or the second and third frames may be used to disambiguate the distance. Moreover, the disambiguated depth information 124 can be determined based on candidate depths from more than two frames. In examples, the more than two frames may be captured at three or more different modulation frequencies, or two of the frames may be captured at the same modulation frequency. In the latter instance, for example, the multiple returns at the same modulation frequency may be used to verify each other. This may be particularly beneficial in the case of a rapidly-changing environment, e.g., because the vehicle is moving relatively quickly and/or because many different objects are in the environment. Similarly, more than two frames captured at more than two integration times may provide even more robust intensity information than the two frames provide in the foregoing example(s). FIG. 4 illustrates an example of using more than two frames to achieve improved intensity values and to disambiguate depth values from data captured by a time-of-flight sensor.

Specifically, FIG. 4 depicts an example process 400 for modifying characteristics of a sensor, such as a time-of-flight sensor, to improve sensor data, as discussed herein. In some examples, the process 400 may be a part of the process 300, although the process 300 does not require the process 400 and the process 400 may have additional uses.

At operation 402, the process 400 receives sensor data captured by a time-of-flight sensor having a first modulation frequency, a first integration time, and a first illumination power, e.g., intensity. For example, the sensor data may be quadrature data generated by the sensor in response to receiving a reflected carrier signal over the first integration time.

At operation 404, the process 400 determines, based on the sensor data, first depth information and first intensity information. For example, the first depth information and/or the first intensity information may be generated from the raw, quadrature data. The first depth information may be a depth, e.g., a distance from the sensor, at which a carrier signal output by the time-of-flight sensor is reflected off an object in the environment, as measured in accordance with a phase shift of the received signal relative to the output carrier signal. The first intensity information may be representative of how much light is reflected off the object and received by a receiver of the sensor. As will be appreciated, the intensity information may also be dependent upon the first integration time (e.g., higher intensities would be anticipated for longer integration times), upon the illumination power (e.g., higher intensities would be anticipated for higher illumination intensities), and/or upon other factors.

At operation 406, the process 400 includes determining, based on additional sensor data captured by the time-of-flight sensor at a second modulation frequency, second depth information. For example, one of the sensor system(s) 104, 206 and/or the vehicle computing device(s) 204 may receive raw sensor data, e.g., the quadrature data, captured at the second modulation frequency and determine, e.g. based on a phase shift relative to the carrier signal emitted at the second modulation frequency, the second depth information. The second modulation frequency may be different from the first modulation frequency. In some examples, the first modulation frequency may be associated with a first maximum range (or distance) of the time-of-flight sensor, and the second modulation frequency may be associated with a second maximum range (or distance) of the time-of-flight sensor. For instance, the maximum ranges may be associated with coprime integers, although other different values may be used. In some examples, the first and/or second modulation frequencies may be in a range of from about 5 MHz to about 50 MHz. For example, a modulation frequency of about 20 MHz may be associated with a 7-meter maximum range or distance.

At operation 408, the process 400 includes determining, based at least in part on the first depth information and the second depth information, one or more depths. For example, when the first depth information and the second depth information may be used to determine a disambiguated depth associated with each of the pixels in the image data. For example, because the depth information may be ambiguous, e.g., because it may be a modulus of the actual depth, at 408, for each pixel, a plurality of first candidate depths may be determined based on the first depth information (in accordance with the first modulation frequency) and a plurality of second candidate depths may be determined based on the second depth information (in accordance with the second modulation frequency). In some instances, the operation 408 may determine the actual depth for each pixel as the depth measurement common to both the plurality of first candidate depths and the plurality of second candidate depths.

At operation 410, the process 400 optionally includes determining, based at least in part on the one or more depths determined at 408 and/or the intensity information, a second integration time and/or a second illumination power. For example, the distance(s) at which objects are detected in the environment may provide a clue as to how best configure the sensor to obtain improved image data. For instance, at 410, the sensor system(s) 104, 206 and/or the vehicle computing device(s) 204 may determine that one or more objects in the environment are at a distance greater than a first threshold distance. To better image those objects with the time-of-flight sensor, it may be desirable to have a relatively higher integration time and/or to have a relatively high illumination power. Similarly, if the sensor system(s) 104, 206 and/or the vehicle computing device(s) 204 determine that one or more objects in the environment are at a distance less than a second threshold (which may be the same as or less than the first threshold), it may be desirable to have a relatively lower integration time and/or to have a relatively low illumination power, e.g., to avoid over-exposure. Moreover, techniques described herein may determine that the first intensity information suggests that several pixels are oversaturated, underexposed, or the like, and may control the integration time and/or the illumination power accordingly.

At operation 412, the process 400 can include receiving second intensity information captured by the time-of-flight sensor at the second integration time and/or the second illumination power. For example, the time-of-flight sensor can be configured to capture one or more frames at the second integration time and/or second illumination power determined at 410. By way of non-limiting example, the first and second integration times may be between about 100 microseconds and about 1 millisecond. As with the first intensity information, the second intensity information may be determined by processing raw quadrature data generated by the time-of-flight sensor.

At operation 414, the process 400 can include determining one or more intensities associated with the environment based at least in part on the first intensity information and the second intensity information. For example, the sensor system(s) 104, 204 can determine a blended intensity for each of the pixels in a composite image frame. In examples described herein, the intensities may be an average or a weighted average of the first illumination power and the second illumination power. In other examples, intensity information from more than two frames of data can be considered to determine per-pixel intensities at operation 414. Although not illustrated, the process 400 may also include determining one or more confidence value(s) associated with the depth and/or intensity information. Such confidence value(s) may be used to determine the intensity values according to operation 414. For example, pixels for which the intensity is too high or too low may be deemed less reliable, and therefore may be down-weighted. In further examples, the pixels that are oversaturated and/or undersaturated may be ignored altogether. The depth information and/or the intensity information may also be used to determine the confidence values. For example, when the first depth information and the second depth information closely relate, e.g., they indicate the same depth, the intensity information may be deemed more reliable than when the first depth information and the second depth information diverge.

According to the foregoing, at least three frames are used to determine disambiguated depth information and blended intensity, e.g., a first and second to disambiguate the depth, and a third (along with the first and/or the second) to resolve the intensity measurements. As will be appreciated, the modulation frequency, the integration time, and/or the illumination power may be continually changed between successive frames or after more than one frame. Thus, in the example just provided, the sensor configured with the second integration time and/or the second illumination power (e.g., configured to sense the second illumination data) may be configured with the first modulation frequency. For example, the modulation frequency may alternate between the first modulation frequency and the second modulation frequency for consecutive frames. Accordingly, while the disambiguated depth is illustrated as being determined using the depth information from the first and second frames, a disambiguated depth may also be determined from depth information associated with the second frame and the third frame (e.g., the frame captured at the second integration time and/or the second illumination power). In other examples, changes to modulation frequency, the integration time, and/or the illumination power may be made less frequently than every frame.

FIG. 5 depicts an example process 500 for controlling an autonomous vehicle relative to objects in an environment, as discussed herein. For example, some or all of the process 500 can be performed by the vehicle 102 of FIG. 1 and/or the vehicle 202 and its related components illustrated in and discussed with reference to, FIG. 2. For example, some or all of the process 500 can be performed by the localization component 222, the perception component 224, the planning component 226, and/or the one or more system controllers 228.

At operation 502, the process can include receiving sensor data, including depth and/or intensity information. For example, the sensor data may be received from a time-of-flight sensor. The sensor data may be raw data, e.g., quadrature data, from which the depth and/or intensity information can be determined in accordance with techniques described herein, or the sensor data may include the intensity and/or depth values. The sensor data may also be received from the time-of-flight sensor on a frame-by-frame basis, e.g., the sensor system may output data comprising the first frame 110(1), the second frame 110(2), etc., or the sensor data may be the resolved frame 120 (or data associated therewith). As detailed herein, the resolved frame 120 may include the blended intensity 122 determined using multiple frames of data at different integration times and/or different illumination intensities. Moreover, the resolved frame 120 may include the disambiguated depth 124 determined using multiple frames of data determined at different modulation frequencies. In still further embodiments the sensor data may be a representation of the environment, e.g., an image of the environment, generated using data from the time-of-flight sensor and/or data generated based on the data from the time-of-flight sensor.

At operation 504, the process 500 can include identifying, based at least in part on the object information, one or more objects in the environment. For example, the localization component 222 and/or the perception component 224 may receive the depth and/or intensity data at 502 and identify objects in the environment. For example, the vehicle computing device(s) 204 may classify objects based on the sensor data and map the objects in the environment relative to the vehicle 202. For instance, the depth and/or intensity information may be used, either alone or in combination with other data, to determine one or more bounding boxes, such as three-dimensional bounding boxes, representative of the sensed objects.

At operation 506, the process 500 can include generating, based on the identified object(s) and additional sensor data (e.g., LiDAR data, radar data, vision data), a travel path, e.g., a trajectory, relative to the object(s). For example, the planning component 226 of the vehicle computing device(s) 204 can further determine relative movement, e.g., velocity and acceleration, of the objects in the environment using one or more sensor modalities, object classification data, and the maps 230 and/or other information to determine the travel path. In some examples, the travel path may be based at least in part on fused data including data from one or more sensor modalities, including a time-of-flight sensor, LiDAR, radar, or the like.

At operation 508, the process 500 can include controlling an autonomous vehicle to follow the travel path. In some instances, the commands generated in the operation 508 can be relayed to a controller onboard an autonomous vehicle to control the autonomous vehicle to drive the travel path. Although discussed in the context of an autonomous vehicle, the process 500, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example vehicle includes a time-of-flight sensor, the time-of-flight sensor including a light emitter configured to emit light modulated with a carrier beam into an environment of the vehicle and a receiver configured to receive the light reflected off one or more objects in the environment, the time-of-flight sensor further configured to generate image data based on the light received at the receiver; one or more processors; and memory storing processor-executable instructions that, when executed by the one or more processors, configure the vehicle to: receive, from the time-of-flight sensor, first data comprising, first intensity information and first depth information, the first image data having an associated first integration time and an associated first modulation frequency; receive, from the time-of-flight sensor, second data comprising second intensity information and second depth information, the second intensity data being based, at least in part, on a second integration time different from the first integration time, and the second depth data being based, at least in part, on a second modulation frequency different from the first modulation frequency; determine, based at least in part on the first depth information and the second depth information, a distance of the object from the time-of-flight sensor; and determine, based at least in part on the first intensity data and the second intensity data, an intensity associated with the object.

B: The vehicle of example A, wherein the light emitter is configurable to emit the light at a first light intensity or to emit the light at a second light intensity, and wherein the first data corresponds to the first light intensity and the second data corresponds to the second light intensity.

C: The vehicle of example A or example B, wherein the intensity is at least one of an average or a weighted average of the first intensity information and the second intensity information.

D: The vehicle of any one of example A through example C, wherein second integration time is based, at least in part, on at least one of the first depth information or the first intensity information.

E: The vehicle of any one of example A through example D, wherein the instructions, when executed by the one or more processors, further configure the vehicle to: determine, based at least in part on at least one of the distance of the object from the vehicle or the intensity associated with the object, a position of the object in the environment; determine a trajectory through the environment relative to the object; and control the vehicle to travel along the travel path.

F: An example method includes: receiving, from a time-of-flight sensor configured in a first configuration, first data comprising first intensity information and first depth information, the first configuration comprising a first integration time, a first illumination power, and a first modulation frequency; receiving, from the time-of-flight sensor configured in at least one additional configuration, second data comprising second intensity information and second depth information, the second configuration comprising a second modulation frequency and at least one of a second integration time different from the first integration time or a second illumination power different from the first illumination power; determining, based at least in part on the first intensity data and the second intensity data, third intensity data representative of the one or more surfaces in an environment of the time-of-flight sensor; and determining, based at least in part on the first depth information and the second depth information, a distance associated with at least a portion of the one or more surfaces.

G: The method of example F, wherein: the at least one additional configuration comprises a second configuration, the second configuration comprises the second modulation frequency; and the second depth information is received with the time-of-flight sensor in the second configuration.

H: The method of example F or example G, wherein: the at least one additional configuration comprises a third configuration, the third configuration comprises the at least one of the second integration time or the second illumination power.

I: The method of any one of example F through example H, wherein the third configuration is based at least in part on at least one of the first depth information, the second depth information, or the first intensity information.

J: The method of any one of example F through example I, wherein the first data comprises a first frame and the second data comprises a second frame captured by the time-of-flight sensor at the second configuration and a third frame captured by the time-of-flight sensor at the third configuration, the first frame, the second frame, and the third frame comprising consecutive frames in a stream.

K: The method of any one of example F through example J, wherein the third intensity value is at least one of an average or a weighted average of the first intensity data and the second intensity data L: The method of any one of example F through example K, wherein the third intensity value is the weighted average, and a weighting factor comprises a confidence value associated with at least one of the first intensity information or the second intensity information.

M: The method of any one of example F through example L, wherein the first modulation frequency is associated with a first non-ambiguous range and the second modulation frequency is associated with a second non-ambiguous range different from the first non-ambiguous range.

N: The method of any one of example F through example M, wherein the first depth information comprises a first phase difference measured at the first modulation frequency and the second depth information comprises a second phase difference measured at the second modulation frequency, the determining the distance comprising: determining, based at least in part on the first phase difference, a plurality of first candidate distances; and determining, based at least in part on the second phase difference, a plurality of second candidate distances, wherein the distance corresponds to a first distance of the plurality of first candidate distances that is substantially similar to a second distance of the plurality of second candidate distances.

O: The method of any one of example F through example N, wherein the first data comprises first depth information for the plurality of pixels, the method further comprising: determining, based at least in part on at least one of the first depth information or the first intensity information, the second integration time, wherein the second integration time is longer than the first integration time when at least one of the first depth is equal to or above a first threshold distance or the first intensity is equal to or below a first threshold intensity, and wherein the second integration time is shorter than the first integration time when at least one of the first depth is equal to or below a second threshold distance or the first intensity is equal to or above a second threshold intensity.

P: The method of any one of example F through example O, further comprising: determining a confidence value associated with at least one of the first intensity information, the second intensity information, the first depth information, or the second depth information.

Q: An example system includes: one or more processors; and computer-readable storage media storing instructions executable by the one or more processors to perform acts comprising: receiving, from a time-of-flight sensor configured to capture emitted light reflected from one or more surfaces in an environment, first intensity information determined based at least in part on a first integration time; receiving, from the time-of-flight sensor, second intensity information, the second intensity information determined based at least in part on a second integration time determining, based at least in part on the first intensity information and the second intensity information, surface intensity data representative of the one or more surfaces; receiving, from the time-of-flight sensor, first depth information, associated with a first modulation frequency; receiving, from the time-of-flight sensor, second depth information associated with a second modulation frequency different from the first modulation frequency; determining, based at least in part on the first depth information and the second depth information, surface distance information representative of a distance associated with the one or more surfaces in the environment; and generating data representing the environment, the data including a surface intensity data and the surface distance information.

R: The system of example Q, the acts further comprising at least one of: determining a first confidence value associated with the first intensity information and a second confidence value associated with the second intensity information, wherein the surface intensity data is further determined based at least in part on at least one of the first confidence value or the second confidence value; or determining a third confidence value associated with the first depth information and a fourth confidence value associated with the second depth information, wherein the surface distance is further determined based at least in part on at least one of the third confidence value or the fourth confidence value.

S: The system of example Q or example R, the acts further comprising: determining, based at least in part on at least at one of the first depth information, the second depth information, or the first intensity information, the second integration time.

T: The system of any one of example Q through example S, wherein determining the distance comprises: determining, based at least in part on the first modulation frequency, a plurality of first candidate distances; and determining, based at least in part on the second modulation frequency, a plurality of second candidate distances, wherein the distance corresponds to a first distance of the plurality of first candidate distances that is substantially similar to a second distance of the plurality of second candidate distances.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A vehicle comprising:
a time-of-flight sensor configured to generate data based on light received at a receiver of the time-of-flight sensor;
one or more processors associated with at least one of the vehicle or the time-of-flight sensor; and
memory storing processor-executable instructions that, when executed, configure the one or more processors to perform acts comprising:
receiving first data generated by the time-of-flight sensor, the first data comprising, first intensity information and first depth information, and the first data having an associated first integration time and an associated first modulation frequency;
receiving second data generated by the time-of-flight sensor, the second data comprising second intensity information and second depth information, the second intensity data being based, at least in part, on a second integration time different from the first integration time, and the second depth data being based, at least in part, on a second modulation frequency different from the first modulation frequency;
determining, based at least in part on the first depth information and the second depth information, a distance of the object from the time-of-flight sensor; and
determining, based at least in part on the first intensity data and the second intensity data, an intensity associated with the object.

2. The vehicle of claim 1, wherein the light emitter is configurable to emit the light at a first light intensity or to emit the light at a second light intensity, and wherein the first data corresponds to the first light intensity and the second data corresponds to the second light intensity.

3. The vehicle of claim 1, wherein the intensity is at least one of an average or a weighted average of the first intensity information and the second intensity information.

4. The vehicle of claim 1, wherein second integration time is based, at least in part, on at least one of the first depth information or the first intensity information.

5. The vehicle of claim 1, the acts further comprising:
determining, based at least in part on at least one of the distance of the object from the vehicle or the intensity associated with the object, a position of the object in the environment;
determining-a trajectory through the environment relative to the object; and
controlling the vehicle to travel along the trajectory.

6. A method comprising:
receiving, from a time-of-flight sensor configured in a first configuration, first data comprising first intensity information and first depth information, the first configuration comprising a first integration time, a first illumination power, and a first modulation frequency;

receiving, from the time-of-flight sensor configured in at least one additional configuration, second data comprising second intensity information and second depth information, the at least one additional configuration comprising a second modulation frequency and at least one of a second integration time different from the first integration time or a second illumination power different from the first illumination power;

determining, based at least in part on the first intensity data and the second intensity data, third intensity data representative of the one or more surfaces in an environment of the time-of-flight sensor; and determining, based at least in part on the first depth information and the second depth information, a distance associated with at least a portion of the one or more surfaces.

7. The method of claim 6, wherein:
the at least one additional configuration comprises a second configuration,
the second configuration comprises the second modulation frequency; and
the second depth information is received with the time-of-flight sensor in the second configuration.

8. The method of claim 7, wherein:
the at least one additional configuration comprises a third configuration,
the third configuration comprises the at least one of the second integration time or the second illumination power.

9. The method of claim 8, wherein the third configuration is based at least in part on at least one of the first depth information, the second depth information, or the first intensity information.

10. The method of claim 9, wherein the first data comprises a first frame and the second data comprises a second frame captured by the time-of-flight sensor at the second configuration and a third frame captured by the time-of-flight sensor at the third configuration, the first frame, the second frame, and the third frame comprising consecutive frames in a stream.

11. The method of claim 6, wherein the third intensity value is at least one of an average or a weighted average of the first intensity data and the second intensity data.

12. The method of claim 11, wherein the third intensity value is the weighted average, and a weighting factor comprises a confidence value associated with at least one of the first intensity information or the second intensity information.

13. The method of claim 6, wherein the first modulation frequency is associated with a first non-ambiguous range and the second modulation frequency is associated with a second non-ambiguous range different from the first non-ambiguous range.

14. The method of claim 13, wherein the first depth information comprises a first phase difference measured at the first modulation frequency and the second depth information comprises a second phase difference measured at the second modulation frequency, the determining the distance comprising:

determining, based at least in part on the first phase difference, a plurality of first candidate distances; and
determining, based at least in part on the second phase difference, a plurality of second candidate distances, wherein the distance corresponds to a first distance of the plurality of first candidate distances that is substantially similar to a second distance of the plurality of second candidate distances.

15. The method of claim 9, wherein the first data comprises first depth information for the plurality of pixels, the method further comprising:

determining, based at least in part on at least one of the first depth information or the first intensity information, the second integration time, wherein the second integration time is longer than the first integration time when at least one of the first depth is equal to or above a first threshold distance or the first intensity is equal to or below a first threshold intensity, and wherein the second integration time is shorter than the first integration time when at least one of the first depth is equal to or below a second threshold distance or the first intensity is equal to or above a second threshold intensity.

16. The method of claim 6, further comprising:
determining a confidence value associated with at least one of the first intensity information, the second intensity information, the first depth information, or the second depth information.

17. A system comprising:
one or more processors; and
computer-readable storage media storing instructions executable by the one or more processors to perform acts comprising:
receiving, from a time-of-flight sensor configured to capture emitted light reflected from one or more surfaces in an environment, first intensity information determined based at least in part on a first integration time;
receiving, from the time-of-flight sensor, second intensity information, the second intensity information determined based at least in part on a second integration time;
determining, based at least in part on the first intensity information and the second intensity information, surface intensity data representative of the one or more surfaces;
receiving, from the time-of-flight sensor, first depth information, associated with a first modulation frequency;
receiving, from the time-of-flight sensor, second depth information associated with a second modulation frequency different from the first modulation frequency;
determining, based at least in part on the first depth information and the second depth information, surface distance information representative of a distance associated with the one or more surfaces in the environment; and
generating data representing the environment, the data including the surface intensity data and the surface distance information.

18. The system of claim 17, the acts further comprising at least one of:
determining a first confidence value associated with the first intensity information and a second confidence value associated with the second intensity information, wherein the surface intensity data is further determined based at least in part on at least one of the first confidence value or the second confidence value; or determining a third confidence value associated with the first depth information and a fourth confidence value associated with the second depth information, wherein the surface distance is further determined based at least in part on at least one of the third confidence value or the fourth confidence value.

19. The system of claim 17, the acts further comprising:
determining, based at least in part on at least at one of the first depth information, the second depth information, or the first intensity information, the second integration time.

20. The system of claim 17, wherein determining the distance comprises:
determining, based at least in part on the first modulation frequency, a plurality of first candidate distances; and
determining, based at least in part on the second modulation frequency, a plurality of second candidate distances,
wherein the distance corresponds to a first distance of the plurality of first candidate distances that is substantially similar to a second distance of the plurality of second candidate distances.

\* \* \* \* \*